US012678746B2

(12) United States Patent
Glomset

(10) Patent No.: US 12,678,746 B2
(45) Date of Patent: Jul. 14, 2026

(54) APPARATUS FOR DISSOLVING GAS INTO A LIQUID AND METHOD FOR PRODUCING THE SAME

(71) Applicant: Linde GmbH, Pullach (DE)

(72) Inventor: Kenneth Glomset, Alesund (NO)

(73) Assignee: Linde GmbH, Pullach (DE)

( * ) Notice: Subject to any disclaimer, the term of this patent is extended or adjusted under 35 U.S.C. 154(b) by 594 days.

(21) Appl. No.: 17/596,872

(22) PCT Filed: Jul. 14, 2020

(86) PCT No.: PCT/EP2020/025332
§ 371 (c)(1),
(2) Date: Dec. 20, 2021

(87) PCT Pub. No.: WO2021/008733
PCT Pub. Date: Jan. 21, 2021

(65) Prior Publication Data
US 2022/0305447 A1     Sep. 29, 2022

(30) Foreign Application Priority Data

Jul. 18, 2019     (EP) ..................................... 19020437

(51) Int. Cl.
*B01F 23/232*          (2022.01)
*B01F 23/2326*        (2022.01)
(Continued)

(52) U.S. Cl.
CPC ........ *B01F 23/2326* (2022.01); *B01F 23/232* (2022.01); *B01F 25/31243* (2022.01);
(Continued)

(58) Field of Classification Search
CPC ................ B01F 23/232; B01F 23/2326; B01F 25/31243; B01F 25/312512;
(Continued)

(56) References Cited

U.S. PATENT DOCUMENTS 1,646,582 A * 10/1927 Halliburton ............. B01F 25/20
                                                                261/76
1,677,265 A * 7/1928 Boving ..................... F04F 1/18
                                                                261/122.1
(Continued)

FOREIGN PATENT DOCUMENTS

DE          42 24 911 A1      1/1994
DE          4330856 A1 *    3/1995
(Continued)

OTHER PUBLICATIONS

English Abstract of WO 2015/095304 A1 (Year: 2015).*
English Machine Translation of DE 4330856 A1 (Year: 1995).*

*Primary Examiner* — Charles S Bushey
(74) *Attorney, Agent, or Firm* — Millen, White, Zelano & Branigan, P.C.; Brion P. Heaney

(57) ABSTRACT
An apparatus for dissolving gas into a liquid is provided having a housing with an inlet opening for the liquid and an outlet opening for the liquid, and a blade unit arranged inside the housing in a small cross section area between the inlet opening and the outlet opening. A flow cross section for the liquid at the small cross section area is smaller than at the inlet opening. The apparatus further includes a gas inlet provided at an outside of the housing and at least one gas outlet provided in the housing on a surface of the blade unit. The at least one gas outlet is connected to the gas inlet by a channel. Methods for producing and using such an apparatus are also provided.

19 Claims, 3 Drawing Sheets

(51) Int. Cl.

| | | |
|---|---|---|
| *B01F 25/312* | (2022.01) | |
| *B01F 35/00* | (2022.01) | |
| *B33Y 10/00* | (2015.01) | |
| *B33Y 80/00* | (2015.01) | |

(52) U.S. Cl.
CPC ................ *B01F 25/312512* (2022.01); *B01F 25/312522* (2022.01); *B01F 35/165* (2022.01); *B33Y 10/00* (2014.12); *B33Y 80/00* (2014.12)

(58) Field of Classification Search
CPC .. B01F 25/312522; B01F 35/65; B33Y 10/00; B33Y 80/00
USPC ...................................... 261/76, 77, DIG. 75
See application file for complete search history.

(56) References Cited

U.S. PATENT DOCUMENTS

| | | | | | |
|---|---|---|---|---|---|
| 2,234,631 | A | * | 3/1941 | Gohre | .................... A62C 31/12 |
| | | | | | 261/DIG. 26 |
| 3,074,697 | A | * | 1/1963 | Friedell | ..................... F16N 7/34 |
| | | | | | 261/78.2 |
| 3,489,396 | A | * | 1/1970 | D'Aragon | ........... B01F 23/2326 |
| | | | | | 210/220 |
| 4,026,527 | A | * | 5/1977 | Costen | .................. C02F 3/1284 |
| | | | | | 261/DIG. 75 |
| 4,051,204 | A | * | 9/1977 | Muller | ............. B01F 23/23342 |
| | | | | | 261/36.1 |
| 4,134,547 | A | * | 1/1979 | Gamst | ....................... B05B 7/10 |
| | | | | | 239/404 |
| 4,193,950 | A | * | 3/1980 | Stockner | ............. B01F 23/2331 |
| | | | | | 261/87 |
| 4,674,888 | A | * | 6/1987 | Carlson | ............. B01F 25/43151 |
| | | | | | 162/57 |
| 5,043,104 | A | | 8/1991 | Stirling | |
| 5,051,213 | A | * | 9/1991 | Weske | .................. B01F 23/233 |
| | | | | | 261/78.2 |
| 5,512,217 | A | * | 4/1996 | Batterham | ............ B01F 35/712 |
| | | | | | 261/36.1 |
| 6,971,843 | B2 | * | 12/2005 | Desy | ......................... F03B 3/02 |
| | | | | | 261/93 |

FOREIGN PATENT DOCUMENTS

| | | | |
|---|---|---|---|
| EP | | 3715605 A1 | 9/2020 |
| WO | | 2011/128824 A1 | 10/2011 |
| WO | WO 2015/095304 A1 | * | 6/2015 |

* cited by examiner

APPARATUS FOR DISSOLVING GAS INTO A LIQUID AND METHOD FOR PRODUCING THE SAME

TECHNICAL FIELD

The invention relates to an apparatus for dissolving gas into a liquid and a method producing such an apparatus.

PRIOR ART

For various applications, gas or gaseous fluids have to be or shall be dissolved in a liquid. A typical example is dissolving (gaseous) oxygen in water. With respect to large water flows, for example, a respective system or apparatus should be mounted in-line with the total water flow upstream the position where the concentration of the selected gas should be increased.

In particular for large water or liquid flows, it is desirable to have a system to be put in-line with the water or liquid flow. There are only very few such systems today (if any) that can be mounted in-line with a large main liquid flow for the introduction of gas into the total flow of liquid in combination with low energy demand and, preferably, no moving parts. This is especially true for huge liquid flows with, e.g., 2000 m³/hour or above.

Today, known technologies, so-called pressure dissolvers (rectors or cones, e.g. the system SOLVOX C provide by the applicant), are often used in by-pass with the main water flow—where the gas and liquid are pressurized inside the unit to give a high mass transfer and high saturation. The highly saturated liquid is then introduced from a high-pressure pipeline downstream the reactor or dissolver into the main pipeline with liquid which has a lower pressure and low saturation.

The ratio between side stream high pressure and high saturated liquid or water to the main flow for re-injection is often in the range of 1:3 to 1:6. This results in an increase of saturation in the main liquid flow based on the mixing of highly saturated liquid from the by-pass dissolving installation. These systems have a high dissolving capacity but also use a high amount of energy to dissolve the gas into the liquid. As an example, with dissolving of oxygen into water, such systems would normally use about 1.5 to 3 kWh per kg oxygen. For large water flows (e.g., 1000 m3/h or above) with high demand for gas dissolving such systems would become very expensive to operate.

In view of this background, the object of the present invention is to provide a more efficient way to dissolve gas into a liquid, preferably for large liquid flows.

DISCLOSURE OF THE INVENTION

This object is achieved by providing an apparatus for dissolving gas into a liquid having a housing with an inlet opening for the liquid and an outlet opening for the liquid, and a blade unit arranged inside the housing in a small cross section area between the inlet opening and the outlet opening, wherein a flow cross section for the liquid at the small cross section area is smaller than at the inlet opening, further comprising a gas inlet provided at an outside of the housing and at least one gas outlet provided in the housing on a surface of the blade unit, the at least one gas outlet being connected to the gas inlet by means of a channel. The object is also achieved by method for producing an apparatus for dissolving gas into a liquid by providing a housing with an inlet opening for the liquid and an outlet opening for the liquid, including arranging a blade unit inside the housing in the small cross section area, wherein a flow cross section of the housing is made smaller at the small cross section area between the inlet opening and 10 the outlet opening than at the inlet opening, and providing a gas inlet at an outside of the housing and at least one gas outlet in the housing on a surface of the blade unit, connecting the at least one gas outlet to the gas inlet by a channel.

An apparatus according to the invention serves for dissolving gas into a liquid and comprises a housing, preferably in form of a tube, with an inlet opening for the liquid and an outlet opening for the liquid, and also comprises a blade unit arranged inside the housing in a small cross section area between the inlet opening and the outlet opening. A flow cross section for the liquid, i.e., a cross section within the housing through with the liquid flows or can flow, at the small cross section area is smaller than at the inlet opening. Typically, such housing or tube can further comprise a flange at each of the two openings or ends, such that the housing or apparatus can be mounted in-line with a conduit for liquid flow or the like.

Since the flow cross section for the liquid is smaller at the small cross section area than at the inlet opening, liquid flowing through the tube has to pass an area with reduced cross section, what results in reduced static pressure in the liquid. This principle is also known as the so-called "Venturi"-principle—such kind of housing or tube is also known as so-called "Venturi"-tube and allows to suck in gas or liquid into the housing—and will be described in more detail later.

The blade unit arranged inside the tube in the small cross section area, on the one hand, contributes to reducing the flow cross section and, on the other hand, helps accelerating the liquid and thus creating low pressure zones. Such blade unit preferably has, at least in part, a cross section in the form of a blade with respect to the flow direction of the liquid.

Further, the apparatus comprises a gas inlet provided at an outside of the housing and at least one gas outlet provided in the housing on a surface of the blade unit, the at least one gas outlet being connected to the gas inlet by means of a channel, the channel preferably being provided in or within the blade unit. Via the gas inlet gas, which is to be dissolved into the liquid, can be provided from the outside and guided via the channel to the at least one gas outlet. Thus, the gas can be sucked and dissolved into the liquid by means of the (static) underpressure in the liquid created by the reduced flow cross section and the blade unit.

Although water is the preferred liquid to be used or described with regard to the present invention, also other kinds of liquids can be used with the proposed apparatus. Further, oxygen is a preferred gas to be introduced into the liquid or, preferably, water. Nevertheless, other gases can be introduced or dissolved into a liquid by means of the proposed apparatus. It is to be noted that the term "gas" in the context of the present invention is not restricted to a pure gas but can also comprise gaseous mixtures of different gases.

To sum up, the main geometry of the apparatus is, in particular, designed as a "Venturi"-tube where the blade geometry—as a part of the blade unit—is placed at a small or narrow, preferably the smallest or narrowest, cross section. The intention of the blade geometry is to accelerate liquid as it passes the blade to create low pressure zones on both sides of the blade for introduction of gas into the liquid.

In general, the "Venturi"-principle is used to intimately contact a gas and a liquid by accelerating the liquid component through a restriction or nozzle into which a pipe can be used to introduce a gas. An incompressible fluid, such as water, must accelerate when it passes through a restriction and, when it does so, the static pressure upstream the restriction will be higher than the pressure in the restriction or nozzle. The liquid or water velocity, in the nozzle, can be high enough to create a sub-atmospheric pressure drop and the gas is drawn into the liquid due to the pressure difference. Alternatively, the apparatus can operate at positive pressure and the gas introduced at a greater pressure than the nozzle operating pressure. For either example, there is always a drop in pressure when an incompressible fluid is accelerated through a restriction. Preferably, the blade unit includes a jet nozzle and at least one connection element, connecting the jet nozzle with an inner wall of the housing. Such jet nozzle can be in form of a small tube or pipe of limited length, the wall of it having a blade shaped cross section, as will be shown, for example, in the drawing. While one connection element might be sufficient to fix the jet nozzle, in particular in the center of the housing or tube in a radial direction, several ones of these connection elements can be used. Preferable numbers of such connection elements are two, three or four, in some cases more than four can be preferred where contact surface area between the gas and liquid has to be increased to achieve higher mass transfer. Each of those connection elements also can have a cross section in the form of a blade. This helps to provide further surfaces with low pressure.

The design of the blade should preferably be made with a target to reduce pressure drop as much as possible. Also, a slight angle on the blade might be desired to create a rotation on the outflow after introduction of gas into the liquid for improved mixing, which will be shown in the drawing.

It is of particular advantage, if the at least one gas outlet is provided at a surface of the jet nozzle and/or on a surface of the at least one connection element. Thus, the gas can be brought into contact with the liquid in particular low pressure zones. Preferably, the at least one gas outlet is provided by at least one opening on the respective surface and/or by the respective surface being a porous surface.

This allows an introduction of the gas in the form of micro bubbles. The openings can be fixed in size through a specific design or it can be through a structure or porous surface with pores at the point where gas and liquid would meet. The introduction of gas into a liquid through small openings or a porous surface is also referred to as diffusion. The mentioned openings can also be designed in the form of a lip, the lip in particular stretching across parts of or an entire length (particularly seen transverse to and/or in the main flow direction of liquid in the housing) of one blade or one blade geometry (of the blade unit), which also will be shown in the drawing below. Such lip design helps the gas to enter into the liquid underneath it from an inside chamber and channels in the actual blade. The gas can then distribute along the lip before it gets teared off at the sharp edge of the lip at low pressure and high velocity of the liquid. Further, it is preferred if an inner cross section (or also the diameter) of the housing or tube decreases from the inlet opening to the small cross section area in a shorter distance than it increases from the small cross section area to the outlet opening. The latter increase can be made by the inner wall of the housing or tube being of conical shape between the small cross section area and the outlet opening. While a reduced flow cross section is already achieved by means of the blade unit (i.e., the presence of the blade unit itself), further and smoother reducing can be achieved by means of special shape of the inner wall of the housing.

Preferably, the apparatus is made as a one-piece apparatus, preferably by means of 3D-printing. This allows a very simple and mechanically very rugged construction of the apparatus. The method of 3D-printing, for example, allows creating the channels within the apparatus or blade unit, as will be described in more detail later.

The invention also refers to a method of producing an apparatus for dissolving gas into a liquid, preferably an apparatus according to the invention, by providing a housing, preferably in the form of a tube, with an inlet opening for the liquid and an outlet opening for the liquid, including arranging a blade unit inside the housing in a small cross section area between the inlet opening and the outlet opening, wherein a flow cross section for the liquid at the small cross section area is made smaller than at the inlet opening, and providing a gas inlet at an outside of the housing and at least one gas outlet inside the housing on a surface of the blade unit, connecting the at least one gas outlet to the gas inlet by means of a channel. Preferably, the apparatus is provided or produces by means of 3D-printing. It is of particular advantage if the apparatus is made or produced as a one-piece apparatus.

It is to be noted that the apparatus can also be provided with several components, each of which might be made by means of 3D-printing, and which afterwards are combined and fixed to one another. This might simplify the production process. In general, 3D-pringing as a way of manufacturing mechanical components has opened up new possibilities of how to design and produce components that has not been possible in the past.

The material to be used for the apparatus can be any suitable plastic material, which can be used with 3D-printing. However, also different metals like stainless steel or aluminum can be used.

The invention also refers to a use of an apparatus according to the invention for dissolving gas into a liquid, wherein the liquid is guided through the housing, entering at the inlet opening and exiting at the outlet opening, and wherein the gas is provided at the gas inlet.

With respect to the advantages and further preferred embodiments of the method for producing the apparatus and the use of the apparatus it is referred to the above remarks to the method in order to avoid repetition.

The apparatus described above, preferably with the embodiments mentioned, will be scalable to fit with any flow desired through standardized or customized piping or tube sizes on the market. For example, for plastic piping (e.g., High Density Poly Ethylene) such size of pipes exists in the range from outer diameter of 20 mm to 2,500 mm. A pipe with dimension of outer diameter of 2,500 mm would have the capacity for liquid flow of up to 30,000 m3/h at a liquid speed of less than 2 m/sec. This would be a normal flow capacity in installations where there would be a need to minimize hydraulic head loss or pressure drop to achieve an efficient energy usage when flowing large water flows in closed piping installations without use of the proposed apparatus.

A scalable in-line gas dissolver apparatus for such large piping and water flows will eliminate the need for external pumping or any by-pass installations. The apparatus can also be adapted for smaller size piping, for example, down to a pipe size of outer diameter of 50 mm.

The invention will now be further described with reference to the accompanying drawings, which show a preferred embodiment.

DETAILED DESCRIPTION OF THE DRAWINGS

Figure 1:
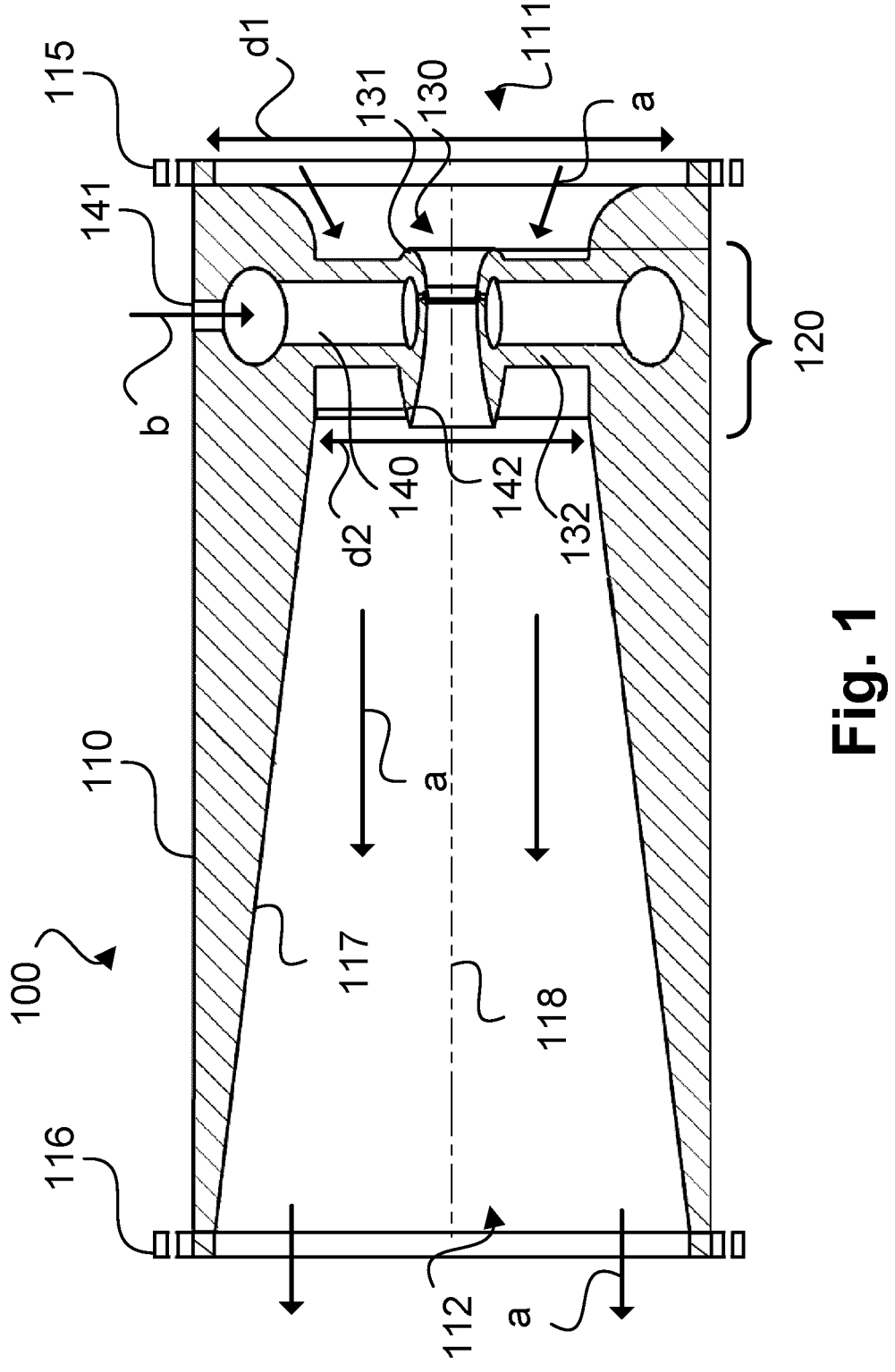
FIG. 1 schematically shows an apparatus according to the invention in a preferred embodiment.

In FIG. 1, an apparatus 100 for dissolving gas into a liquid according to the invention in a preferred embodiment is shown in a cross sectional view. Apparatus 100 comprises a housing 110 in the form of a tube with an inlet opening 111 for a liquid a like water and an outlet opening 112 for liquid a. At both ends of the tube, a respective flange 115 or 116 can be provided in order to allow appropriate mount in-line of a liquid conduit or the like. Of course, other ways of mounting like welding to pipes without flanges are possible.

Inside the tube 110, a blade unit 130 is arranged, the blade unit 130 comprising a jet nozzle 131, having a central hole, and four connection elements 132, having a cross section in the form of a blade. While this specific cross section can hardly be seen for the connection elements 132 (only two of them are visible in FIG. 1), the cross section of the walls of the jet nozzle 131 can clearly be identified as blade shaped. The jet nozzle is centrally placed in the tube 110 with respect to a radial direction, i.e., centrally on the rotation axis 118 of the tube 110.

The wall or inner wall 117 of the tube 110 is shaped such that the inner diameter or cross section is smaller or narrow at the small cross section area 120, in which the blade unit 130 is arranged, than at the inlet opening 111 and at the outlet opening 112. Just by example, references d1 and the inlet opening 111 and d2 at the small cross section area 120 are shown in order to demonstrate the different cross sectional areas, in particular for the flow of liquid a.

Please note that the shown shape of the inner wall 117, including a conical shape between the small cross section area 120 and the outlet opening 116 and a rounded shape between the inlet opening 111 and the small cross section area 120 helps to improve the "Venturi"-effect and to guide the liquid in an optimal way. Nevertheless, the shape of the inner wall 117 could omit the conical and/or rounded shape, i.e., the tube could be of plain hollow cylindrical shape. As mentioned earlier, the blade unit 130 itself contributes to reducing the flow cross section.

It is to be noted that the flow cross section for liquid a in the small cross section area 120—or, in general, at the area or position with the narrowest cross section—is not only defined by the diameter of the inner wall 117 but is also influence by the cross section of the blade unit 130.

Further, a channel or channels 140 are provided inside the blade unit 130, i.e., inside the jet nozzle 131 and inside the connection elements 132, providing a connection between a gas inlet 141 provided at the outside of the tube 110 and several gas outlets 142 provide at the blade unit 130. For a more detailed view of the gas outlets 142 please refer to FIG. 2. Gas b, which shall be dissolved in the liquid a, can be introduced into the apparatus 100 via gas inlet 141. Gas b, which, e.g., can be oxygen, can then be guided through channel 140 to the gas outlets 142 and then be introduced or dissolved into liquid a.

As mentioned before, the special geometry of the apparatus with the reduced flow cross section for liquid a, a low static pressure is generated at the surface of the blade unit and, in particular, at the position of the gas outlets 142, and thus, gas b is drawn into the liquid a.

Figure 2:
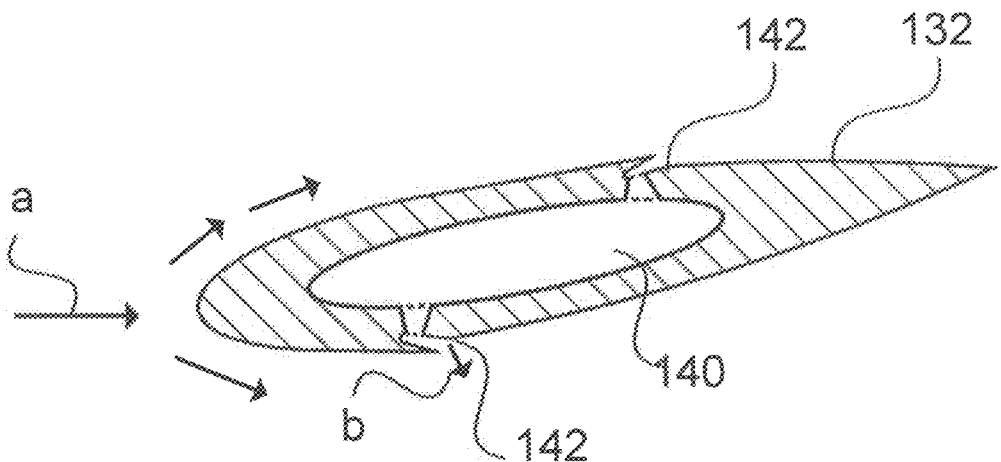
FIG. 2 schematically shows a part of the apparatus of FIG. 1 in a more detailed view.

In FIG. 2, a cross section of connection element 132 as a part of the apparatus 100 of FIG. 1 is shown in a more detailed view. Inside the connection element 132 the channel 140 is provided, which is connected to, e.g., two gas outlets 142.

Due to the liquid a flowing along the curved surfaces of the connection element 132—which has the shape of a blade—underpressure or low static pressure of the liquid a is generated at the surface of the connection element 132 and, in particular, at the positions of the gas outlets 142. By means of the underpressure, gas b is drawn out of the gas outlets 142 and into the liquid a, such that it is dissolved in the liquid a.

The gas outlets 142 are preferably design with a lip or in a lip design such that the eventual outlet for the gas b is arranged averted to the flow direction of the liquid a. The lip in particular stretches across parts of or an entire length of one blade geometry. This helps to improve dissolving the gas b into the liquid a, in addition to prevent any potential clogging issues of the gas outlet openings or the respective channels.

Please also note that the orientation of the connection element 132 or its cross section as shown in FIG. 2 is slightly inclined with respect to the flow direction of liquid a. This can be achieved, for example, by designing the blade shaped connection elements with a slight rotation around axis 118 of FIG. 1.

Further, it is to be noted that the cross section shown in FIG. 2 as an example for connection element 132 can also apply to the cross section of the jet nozzle 131 shown in FIG. 1.

Figure 3:
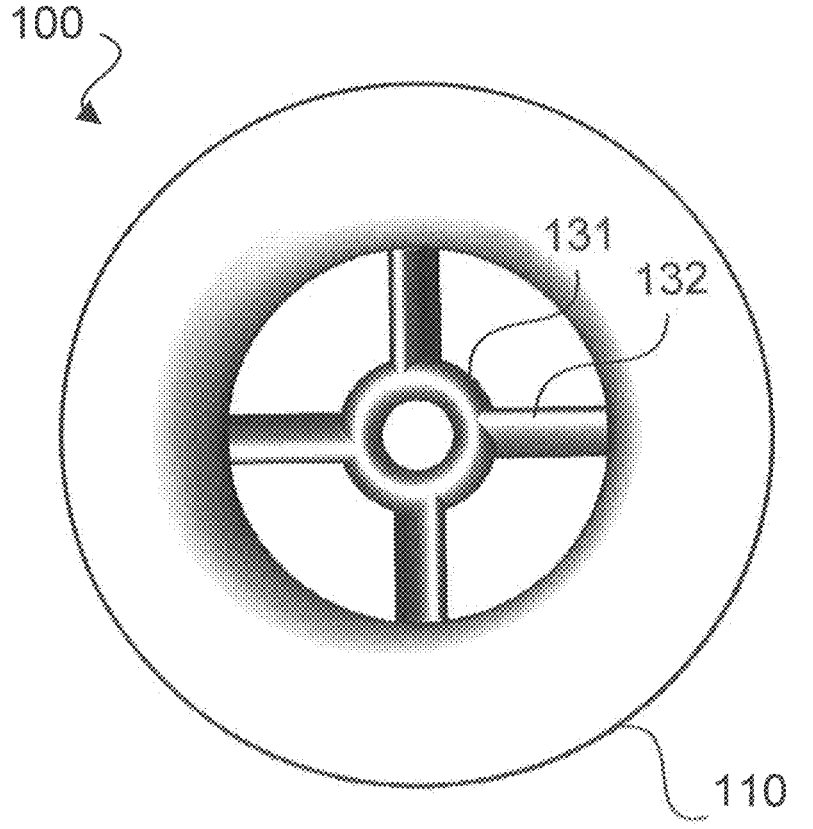
FIG. 3 schematically shows the apparatus of FIG. 1 in another view.

In FIG. 3, the apparatus 100 of FIG. 1 is shown in a top view, seen from the inlet opening 111 of FIG. 1 along the axis 118. In this view, four connection elements 132 connecting jet nozzle 131 to the tube 110 or its inner wall are shown.

Figure 4:
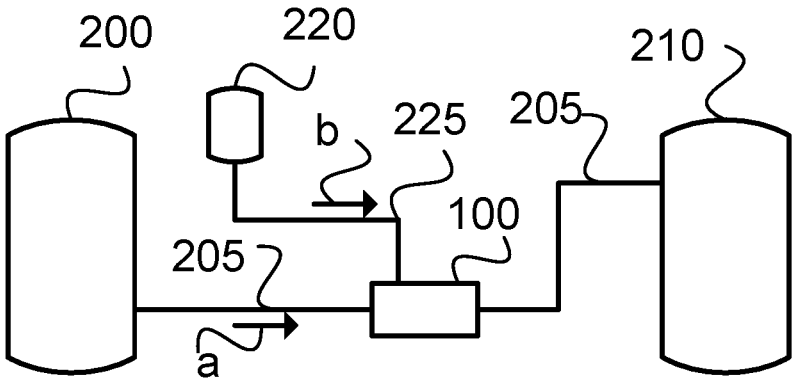
FIG. 4 schematically shows a use of an apparatus according to the invention in a preferred embodiment.

In FIG. 4, the use of an apparatus 100 according to the invention in a preferred embodiment is shown. A liquid a, for example water, can be supplied from a tank 200 (or an open header tank) and shall be provided to another tank 210 (can also be an open header tank) via a conduit 205. In order to dissolve a gas b, for example oxygen, in the water a before being filled into or supplied to tank 210, apparatus 100 as, e.g., shown in FIGS. 1 to 3 can be used.

Apparatus 100 is mounted in-line with the conduit 205 and the oxygen b is supplied from a gas storage and/or dosing system 220 via a pipe 225 to the gas inlet (not shown in FIG. 4) of the apparatus 100. In this way, the oxygen can very efficiently be dissolved into the water a before filled into tank 210 as described before.

Preferably, the apparatus 100 can be used with a system shown and described in EP 2 008 513 B1. In particular, the apparatus 100 can be mounted upstream the muff coupling shown in FIG. 2 of EP 2 008 513 B1, at the position of the water inlet pipe. Thus, the tank shown in FIG. 2 of EP 2 008 513 B1 would replace or be used as the tank 210 shown in FIG. 3 of this application.

Also, the apparatus 100 can be used with a system shown and described in U.S. Pat. No. 8,556,236 B2. In particular, the apparatus 100 can be integrated between pipes 4 and 7 shown in FIG. 1 of U.S. Pat. No. 8,556,236 B2, replacing the gas dissolving unit 2.

The apparatus described in various embodiments herein will allow for in-line dissolving of gas into liquid for large liquid flow at low energy usage and it will result in very low pressure drop with almost no significant increase over a certain flow range due to the jet design (centre nozzle) for pressure recovery. Further, it will eliminate the need for any additional pump installations as it can be mounted in-line with the main liquid flow (see, e.g., FIG. 4) operating only on the energy provided from the main flow Further, such apparatus can eliminate the need for external installations requiring space or other specific infrastructure for dissolving the selected gas into a liquid flow. It is scalable to fit with any liquid flow desired, e.g., from 20 to 30 000 m³/hour and it can be mounted in-line the main pipe and water or liquid flow using flanges or any other jointing system.

Also, the apparatus provides the possibility to increase gas saturation in any liquid inside a closed piping system regardless of the pipe size and it creates a faster dissolving/higher dissolving efficiency of gas into a liquid due to shorter transport distances from gas injection (the gas inlet) to the middle of the flow volume at the point of injection.

An increased gas to liquid dissolving efficiency can arise due to better mixing after the blade as a result of a slight turning current (depending on blade angle compared to flow 30 direction as shown in and described with respect to FIG. 3). Further, it allows for an efficient dissolving of the gas into a large water flow by introducing micro bubbles of gas across the fin or trailing edge of a blade in combination with a restriction passage (due to the "Venturi"-effect) at very low energy demand (operational pressure loss is typically between 0.01 and 0.05 bar).

Further, the apparatus can be produced without a specific outer tube for in-line mounting into a larger construction, e.g., into a fish tank water distribution device for aquaculture in that an existing pipe or tube of a conduit is used as the tube of the apparatus described herein before.

The invention claimed is:

1. An apparatus for dissolving gas into a liquid, comprising:
  a housing with an inlet opening for the liquid and an outlet opening for the liquid, said housing having an area with a smaller flow cross section for the liquid than the inlet opening flow cross section, and the area of smaller flow cross section is positioned between the inlet opening and the outlet opening,
  a blade unit arranged inside the area with smaller flow cross section, and
  a gas inlet provided at an outside of the housing and a plurality of gas outlets provided in the housing on a surface of the blade unit, the plurality of gas outlets being connected to the gas inlet by one or more channels,
  wherein the blade unit includes a jet nozzle and at least one connection element that connects the jet nozzle to an inner wall of the housing, and the at least one connection element has a cross section in the form of a blade, and
  wherein at least one of the plurality of gas outlets is provided at a surface of the jet nozzle and at least one other of the plurality of gas outlets is provided on a surface of the at least one connection element.

2. The apparatus according to claim 1, wherein the at least one of the plurality of gas outlets is at least one opening on the surface of the jet nozzle and the at least one other of the plurality of gas outlets is at least one opening on the surface of the at least one connection element.

3. The apparatus according to claim 1, wherein at least one of the plurality of gas outlets is provided in the form of a lip.

4. The apparatus according to claim 1, wherein the one or more channels are provided in the blade unit.

5. The apparatus according to claim 1, wherein the apparatus is a one-piece apparatus.

6. A method for dissolving gas into a liquid using the apparatus according to claim 1, comprising guiding liquid through the housing of the apparatus, wherein liquid enters at the inlet opening and exits at the outlet opening, and wherein the gas is introduced via the gas inlet.

7. The apparatus according to claim 1, wherein the at least one of the plurality of gas outlets is at least one opening on the surface of jet the nozzle and the at least one other of the plurality of gas outlets is at least one opening on the surface of the at least one connection element, or
  at least one of the plurality of gas outlets is provided by a porous surface of the jet nozzle, and the at least one other of the plurality of gas outlets is provided by a porous surface of the at least one connection element.

8. The apparatus according to claim 1, wherein at least one of the plurality of gas outlets is provided in the form of a lip that stretches across parts of or an entire length of one blade geometry.

9. The apparatus according to claim 1, wherein the apparatus is a one-piece apparatus made by 3D-printing.

10. The apparatus according to claim 1, wherein the jet nozzle is in the form of a tube or pipe in which a wall of the tube or pipe has a blade shaped cross section.

11. The apparatus according to claim 1, wherein the apparatus has a plurality of the connection elements that connect the jet nozzle to the inner wall of the housing, wherein each of the connection elements has a cross section in the form of a blade.

12. The apparatus according to claim 1, wherein the at least one connection element is angled so as to create a rotation of the liquid after introduction of the gas into the liquid.

13. The apparatus according to claim 1, wherein the surface of the jet nozzle is porous, the surface of the at least one connection element is porous, or both the surface of the jet nozzle and the surface of the at least one connection element is porous, wherein the porous surface on the jet nozzle and/or the connection element forms the at least one of the plurality of gas outlets.

14. A method for producing an apparatus for dissolving gas into a liquid, the method comprising:
  providing a housing with an inlet opening for the liquid and an outlet opening for the liquid, said housing having an area with a smaller flow cross section than the inlet opening flow cross section, and the area of smaller flow cross section is positioned between the inlet opening and the outlet opening,
  arranging a blade unit inside the housing in the area of smaller flow cross section, and
  providing a gas inlet at an outside of the housing and a plurality of gas outlets in the housing on a surface of the blade unit, connecting the plurality of gas outlets to the gas inlet by one or more channels,
  wherein the blade unit includes a jet nozzle and at least one connection element that connects the jet nozzle to an inner wall of the housing, and the at least one connection element has a cross section in the form of a blade, and
  wherein at least one of the plurality of gas outlets is provided at a surface of the jet nozzle and at least one other of the plurality of gas outlets is provided on a surface of the at least one connection element.

15. The method according to claim 14, wherein the apparatus is provided by 3D-printing.

16. The method according to claim 14, wherein the apparatus is made as a one-piece apparatus.

17. An apparatus for dissolving gas into a liquid, comprising:

a housing with an inlet opening for the liquid and an outlet opening for the liquid, said housing having an area with a smaller flow cross section for the liquid than the inlet opening flow cross section, and the area of smaller flow cross section is positioned between the inlet opening and the outlet opening, a blade unit arranged inside the area with smaller flow cross section, and a gas inlet provided at an outside of the housing and a plurality of gas outlets provided in the housing on a surface of the blade unit, the plurality of gas outlets being connected to the gas inlet by one or more channels, wherein the blade unit includes a jet nozzle and at least one connection element that connects the jet nozzle to an inner wall of the housing, and the at least one connection element has a cross section in the form of a blade having a tapered section, and wherein at least one of the plurality of gas outlets is provided at a surface of the jet nozzle and at least one other of the plurality of gas outlets is provided on a surface of the at least one connection element.

18. The apparatus according to claim 17, wherein the jet nozzle is in the form of a tube or pipe in which a wall of the tube or pipe has a blade shaped cross section with a tapered section.

19. The apparatus according to claim 17, wherein the area of smaller flow cross section for liquid generates a reduced static pressure at the position of the at least one of the plurality of gas outlets.

* * * * *